United States Patent
Khlat

(10) Patent No.: US 9,225,382 B2
(45) Date of Patent: Dec. 29, 2015

(54) TUNABLE FILTER FRONT END ARCHITECTURE FOR NON-CONTIGUOUS CARRIER AGGREGATION

(71) Applicant: RF Micro Devices, Inc., Greensboro, NC (US)

(72) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 19 days.

(21) Appl. No.: 14/282,393

(22) Filed: May 20, 2014

(65) Prior Publication Data
US 2014/0342678 A1 Nov. 20, 2014

Related U.S. Application Data

(60) Provisional application No. 61/825,236, filed on May 20, 2013.

(51) Int. Cl.
*H04B 1/44* (2006.01)
*H04B 7/08* (2006.01)

(52) U.S. Cl.
CPC ............................ *H04B 1/44* (2013.01)

(58) Field of Classification Search
CPC .............. H04B 1/48; H04B 1/50; H04B 1/52; H04B 1/54; H04B 1/56; H04B 1/58
USPC ........................ 455/78–83; 333/101
See application file for complete search history.

(56) References Cited

U.S. PATENT DOCUMENTS

| | | | |
|---|---|---|---|
| 7,376,440 B2 * | 5/2008 | Forrester et al. | 455/553.1 |
| 7,546,091 B2 * | 6/2009 | Murakami et al. | 455/78 |
| 8,849,217 B2 | 9/2014 | Rousu et al. | |
| 8,903,409 B2 | 12/2014 | Winiecki et al. | |
| 2002/0130734 A1 | 9/2002 | Liang et al. | |
| 2006/0194550 A1 | 8/2006 | Block et al. | |
| 2013/0077540 A1 | 3/2013 | Black et al. | |
| 2014/0003300 A1 | 1/2014 | Weissman et al. | |
| 2014/0192845 A1 | 7/2014 | Szini et al. | |
| 2014/0328220 A1 * | 11/2014 | Khlat et al. | 370/278 |
| 2014/0376417 A1 * | 12/2014 | Khlat | 370/277 |

OTHER PUBLICATIONS

Non-Final Office Action for U.S. Appl. No. 14/498,991, mailed Aug. 17, 2015, 13 pages.
Notice of Allowance for U.S. Appl. No. 14/302,500, mailed Oct. 23, 2015, 8 pages.

* cited by examiner

*Primary Examiner* — Lee Nguyen
(74) *Attorney, Agent, or Firm* — Withrow & Terranova, P.L.L.C.

(57) ABSTRACT

Front end circuitry for a mobile terminal includes separate receive paths and filtering elements for different portions of each operating band. Accordingly, the filtering elements for each receive path can be designed with a smaller pass-band, thereby reducing the complexity of filtering circuitry in the front end circuitry and improving the efficiency thereof.

23 Claims, 6 Drawing Sheets

| OPERATING BAND | UPLINK (UL) OPERATING BAND | DOWNLINK (DL) OPERATING BAND | DUPLEX MODE |
|---|---|---|---|
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | RESERVED | RESERVED | - |
| 16 | RESERVED | RESERVED | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

*FIG. 1*
*(RELATED ART)*

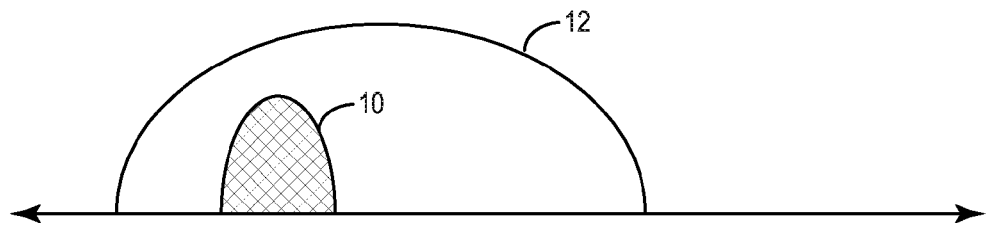
FIG. 2A
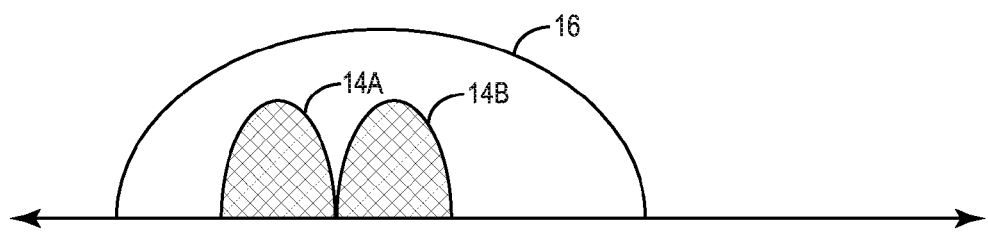
FIG. 2B
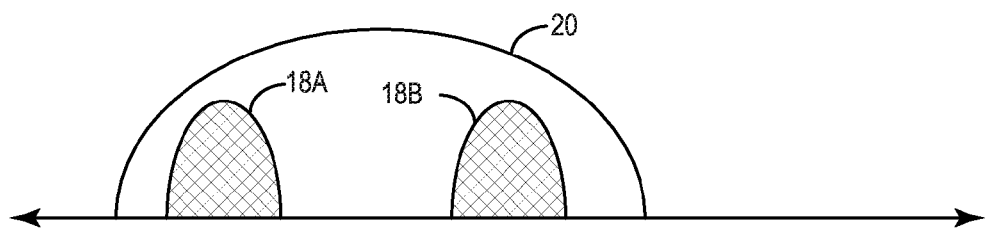
FIG. 2C
FIG. 2D
FIG. 2
(RELATED ART)

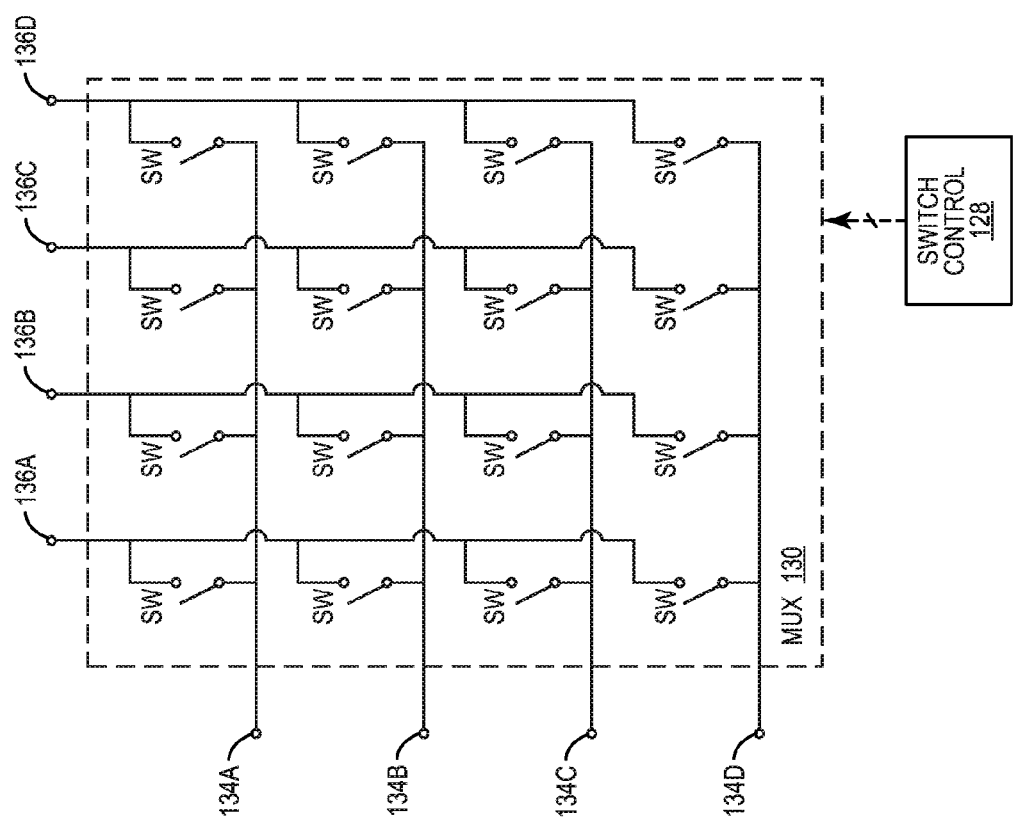

TUNABLE FILTER FRONT END ARCHITECTURE FOR NON-CONTIGUOUS CARRIER AGGREGATION

RELATED APPLICATIONS

This application claims the benefit of U.S. provisional patent application Ser. No. 61/825,236, filed May 20, 2013, the disclosure of which is incorporated herein by reference in its entirety.

FIELD OF THE DISCLOSURE

The present disclosure relates to front end circuitry for a wireless communication system capable of operating in one or more carrier aggregation configurations.

BACKGROUND

Modern mobile telecommunications standards continue to demand increasingly greater rates of data exchange (data rates). One way to increase the data rate of a mobile device is through the use of carrier aggregation. Carrier aggregation allows a single mobile device to aggregate bandwidth across one or more operating bands in the wireless spectrum. The increased bandwidth achieved as a result of carrier aggregation allows a mobile device to obtain higher data rates than have previously been available.

FIG. 1 shows a table describing a number of wireless communication operating bands in the wireless spectrum. One or more of the operating bands may be used, for example, in a Code Division Multiple Access (CDMA), Global System for Mobile Communications (GSM), Long Term Evolution (LTE), or LTE-advanced equipped mobile device. The first column indicates the operating band number for each one of the operating bands. The second and third columns indicate the uplink and downlink frequency bands for each one of the operating bands, respectively. Finally, the fourth column indicates the duplex mode of each one of the operating bands. In non-carrier aggregation configurations, a mobile device will generally communicate using a single portion of the uplink or downlink frequency bands within a single operating band. In carrier aggregation applications, however, a mobile device may aggregate bandwidth across a single operating band or multiple operating bands in order to increase the data rate of the device.

FIG. 2A shows a diagram representing a conventional, non-carrier aggregation configuration for a mobile device. In this conventional configuration, a mobile device communicates using a single portion of the wireless spectrum 10 within a single operating band 12. Under the conventional approach, the data rate of the mobile device is constrained by the limited available bandwidth.

FIGS. 2B-2D show diagrams representing a variety of carrier aggregation configurations for a mobile device. FIG. 2B shows an example of contiguous intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated portions of the wireless spectrum 22A and 22B are located in different operating bands 24 and 26. A modern mobile device should be capable of supporting each one of the previously described carrier aggregation configurations.

FIG. 3 shows conventional front end circuitry 30 for a wireless communications system capable of operating in one or more carrier aggregation configurations. The conventional front end circuitry 30 includes a first antenna 32A, a second antenna 32B, a first diplexer 34A, a second diplexer 34B, front end switching circuitry 36, filtering circuitry 38, and transceiver circuitry 40. The transceiver circuitry 40 includes a first transceiver module 42A, a second transceiver module 42B, a first receiver module 44A, and a second receiver module 44B. As will be appreciated by those of ordinary skill in the art, the first transceiver module 42A and the first receiver module 44A may each be associated with a first operating band (hereinafter referred to as band A), such that the first transceiver module 42A is configured to support the transmission and reception of signals about band A, and the first receiver module 44A is configured to support the reception of signals about band A. Similarly, the second transceiver module 42B and the second receiver module 44B may each be associated with a second operating band (hereinafter referred to as band B), such that the second transceiver module 42B is configured to support the transmission and reception of signals about band B, and the second receiver module 44B is configured to support the reception of signals about band B.

The first transceiver module 42A includes a first power amplifier 46 and a first low noise amplifier (LNA) 48. The first transceiver module 42A is configured to receive band A baseband transmit signals at a band A transmit node TX_A, amplify the band A baseband transmit signals to a level appropriate for transmission from the first antenna 32A or the second antenna 32B using the first power amplifier 46, and deliver the amplified band A transmit signals to the front end switching circuitry 36 through the filtering circuitry 38. The first transceiver module 42A is further configured to receive band A receive signals at the first LNA 48 through the filtering circuitry 38, amplify the band A receive signals using the first LNA 48, and deliver the amplified band A receive signals to a band A receive node RX_A for further processing, for example, by the baseband circuitry (not shown).

Similar to the first transceiver module 42A, the second transceiver module 42B includes a second power amplifier 50 and a second LNA 52. The second transceiver module 42B is configured to receive band B baseband transmit signals at a band B transmit node TX_B, amplify the band B baseband transmit signals to a level appropriate for transmission from one of the first antenna 32A and the second antenna 32B using the second power amplifier 50, and deliver the amplified band B transmit signals to the front end switching circuitry 36 through the filtering circuitry 38. The second transceiver module 42B is further configured to receive band B receive signals at the second LNA 52 through the filtering circuitry 38, amplify the band B receive signals using the second LNA 52, and deliver the amplified band B receive signals to a band B receive node RX_B for further processing, for example, by baseband circuitry (not shown).

As discussed above, the conventional front end circuitry 30 is configured to operate in one or more carrier aggregation modes of operation. Accordingly, the first receiver module 44A, the second receiver module 44B, and the filtering circuitry 38 are provided. The first receiver module 44A includes a first receiver LNA 54. The first receiver module 44A is configured to receive band A receive signals from the front end switching circuitry 36 at the first receiver LNA 54 through the filtering circuitry 38, amplify the band A receive signals using the first receiver LNA 54, and deliver the amplified band A receive signals to a second band A receive node RX_A1 for further processing, for example, by baseband circuitry (not shown). Similarly, the second receiver module 44B includes a second receiver LNA 56. The second receiver module 44B is configured to receive band B receive signals from the front end switching circuitry 36 at the second receiver LNA 56 through the filtering circuitry 38, amplify the band B receive signals using the second receiver LNA 56, and deliver the amplified band B receive signals to a second band B receive node RX_B1 for further processing, for example, by baseband circuitry (not shown).

The filtering circuitry 38 includes a first duplexer 58A, a second duplexer 58B, a first receiver filter 60A, and a second receiver filter 60B. The first duplexer 58A passes band A transmit signals between the first power amplifier 46 and the front end switching circuitry 36 and passes band A receive signals between the front end switching circuitry 36 and the first LNA 48, while attenuating signals outside of the respective transmit and receive signal bands. Similarly, the second duplexer 58B passes band B transmit signals between the second power amplifier 50 and the front end switching circuitry 36 and passes band B receive signals between the front end switching circuitry 36 and the second LNA 52, while attenuating signals outside of the respective transmit and receive signal bands. The first receiver filter 60A passes band A receive signals between the front end switching circuitry 36 and the first receiver LNA 54, while attenuating other signals. Similarly, the second receiver filter 60B passes band B receive signals between the front end switching circuitry 36 and the second receiver LNA 56, while attenuating other signals.

The front end switching circuitry 36 includes band selection circuitry 62, antenna swapping circuitry 64, and switching control circuitry 66. The band selection circuitry 62 includes low-band selection circuitry 68 and mid/high-band selection circuitry 70 for each one of the first antenna 32A and the second antenna 32B. Specifically, the band selection circuitry 62 includes first low-band band selection circuitry 68A coupled to the first antenna 32A through the first diplexer 34A, first mid/high-band selection circuitry 70A coupled to the first antenna 32A through the first diplexer 34A, second low-band selection circuitry 68B coupled to the second antenna 32B through the second diplexer 34B, and second mid/high-band selection circuitry 70B coupled to the second antenna 32B through the second diplexer 34B. Each one of the diplexers 34 are configured to pass low-band signals between the connected low-band selection circuitry 68 and the connected one of the antennas 32, pass mid/high-band signals between the connected mid/high-band selection circuitry 70 and the connected one of the antennas 32, and attenuate signals outside of the respective low and mid/high bands while providing isolation between the connected low-band selection circuitry 68 and the mid/high-band selection circuitry 70. The band selection circuitry 62 is configured to place one or more modules in the transceiver circuitry 40 in contact with the first antenna 32A or the second antenna 32B in order to transmit and receive signals about the operating bands associated with the one or more transceiver modules 42.

The antenna swapping circuitry 64 is coupled between the transceiver circuitry 40 and the band selection circuitry 62, and is configured to swap the antenna 32 presented to the first duplexer 60A, the second duplexer 60B, the first receiver filter 60A, and the second receiver filter 60B. As will be appreciated by those of ordinary skill in the art, the antenna swapping circuitry 64 may swap antennas 32 between the respective filtering elements in the filtering circuitry 38 in order ensure that signals are transmitted from either the first transceiver module 42A or the second transceiver module 42B using the one of the antennas 32 with the most favorable transmission characteristics at the time.

The switching control circuitry 66 operates the band selection circuitry 62 and the antenna swapping circuitry 64. In a first operating mode of the front end switching circuitry 36, the switching control circuitry 66 operates the band selection circuitry 62 and the antenna swapping circuitry 64 to place the first transceiver module 42A and the second transceiver module 42B in contact with the first antenna 32A through the first duplexer 58A and the second duplexer 58B, respectively, and place the first receiver module 44A and the second receiver module 44B in contact with the second antenna 32B through the first receiver filter 60A and the second receiver filter 60B, respectively. In this configuration, the conventional front end circuitry 30 may simultaneously transmit band A signals while receiving band A signals and band B signals from the first antenna 32A, and simultaneously receive band A signals and band B signals from the second antenna 32B. Alternatively in this configuration, the conventional front end circuitry 30 may simultaneously transmit band B signals while receiving band A and band B signals from the first antenna 32A, and simultaneously receive band A signals and band B signals from the second antenna 32B.

In a second operating mode of the front end switching circuitry 36, the switching control circuitry 66 operates the band selection circuitry 62 and the antenna swapping circuitry 64 to place the first transceiver module 42A and the second transceiver module 42B in contact with the second antenna 32B through the first duplexer 58A and the second duplexer 58B, respectively, and place the first receiver module 44A and the second receiver module 44B in contact with the first antenna 32A through the first receiver filter 60A and the second receiver filter 60B, respectively. In this configuration, the conventional front end circuitry 30 may simultaneously transmit band A signals while receiving band A signals and band B signals from the second antenna 32B, and simultaneously receive band A signals and band B signals from the first antenna 32A. Alternatively in this configuration, the conventional front end circuitry 30 may simultaneously transmit band B signals while receiving band A signals and band B signals from the second antenna 32B, and simultaneously receiving band A signals and band B signals from the first antenna 32A.

Although capable of operating in one or more carrier aggregation configurations, the conventional front end circuitry 30 generally suffers from poor efficiency. As discussed above, both the first transceiver module 42A and the second transceiver module 42B are connected to either the first antenna 32A or the second antenna 32B, depending on which antenna is used for the transmission of signals, at any given time. Accordingly, at least one of the first antenna 32A or the second antenna 32B is always loaded by at least a quadplexer, which is formed from the combination of the first duplexer 58A and the second duplexer 58B. The relatively large load associated with the combination of the first duplexer 58A and the second duplexer 58B results in excessive insertion loss in the conventional front end circuitry 30, thereby degrading the efficiency of a mobile terminal in which the conventional front end circuitry 30 is incorporated.

As shown in FIG. 3, each filtering element in the filtering circuitry 38 is tunable, such that the filter response of the various filtering elements can be tuned to isolate a signal or signals about a given frequency range. In intra-band non-contiguous carrier aggregation applications, using tunable filtering elements in the conventional front end circuitry 30 may be problematic, as the bandwidth of the pass band of each one of the filtering elements may need to accommodate at least an entire operating band (i.e., the required pass-band of each filtering element could be as large as 80 MHz in some cases). In other words, because only two antennas 32 are provided in the conventional front end circuitry 30, and because only one transceiver module 42 and one receiver module 44 are provided for each operating band in the conventional front end circuitry 30, the filtering element associated with each one transceiver module 42 or receiver module 44 must be capable of passing signals about the entire operating band to its associated transceiver module 42 or receiver module 44 when the conventional front end circuitry 30 is operating in an intra-band non-contiguous carrier aggregation configuration. That is, since intra-band non-contiguous carrier aggregation may involve aggregating bandwidth about portions of an operating band located at separate ends of the operating band, each one of the filtering elements in the filtering circuitry 38 must be capable of passing these signals to the appropriate transceiver module 42 or receiver module 44 in the transceiver circuitry 40 in order to properly operate in such a configuration. As will be appreciated by those of ordinary skill in the art, tunable filtering elements including a large pass-band are difficult to design and manufacture, often adding cost and complexity to the front end circuitry in which they are incorporated. Further, such tunable filtering elements may introduce a significant amount of insertion loss as a result of the required pass-band, thereby degrading the performance of the conventional front end circuitry 30. Accordingly, there is a need for front end circuitry that is capable of operating in a variety of carrier aggregation configurations while also maintaining the efficiency and performance of the front end circuitry.

SUMMARY

The present disclosure relates to front end circuitry for a mobile terminal capable of operating in one or more carrier aggregation configurations. According to one embodiment, front end circuitry for a mobile terminal includes a first duplexer, a first receiver filter, a second receiver filter, a third receiver filter, and front end circuitry. The first duplexer is configured to pass transmit signals about a first operating band between a first transceiver node and a first switching node and pass receive signals about a first portion of the first operating band between the first switching node and a second transceiver node, while attenuating other signals. The first receiver filter is configured to pass receive signals about the first portion of the first operating band between a second switching node and a third transceiver node, while attenuating other signals. The second receiver filter is configured to pass receive signals about a second portion of the first operating band between a third switching node and a fourth transceiver node, while attenuating other signals. The third receiver filter is configured to pass receive signals about the second portion of the first operating band between a fourth switching node and a fifth transceiver node, while attenuating other signals. The front end switching circuitry is coupled between each one of the switching nodes and at least four antenna nodes, and is configured to place each one of the switching nodes in contact with a different one of the antenna nodes. By using separate receive paths for signals about the first portion of the first operating band and signals about the second portion of the second operating band, the required pass band of each filtering element in each one of the receive paths can be significantly reduced, thereby resulting in less complex filtering circuitry and improved performance of the front end circuitry.

According to one embodiment, the first portion of the first operating band and the second portion of the first operating band are non-contiguous.

According to one embodiment, the front end circuitry also includes a diplexer between each one of the antenna nodes and the front end switching circuitry, each diplexer including a low-band signal path and a high-band signal path.

According to one embodiment, the front end switching circuitry is configured to place each one of the first switching node, the second switching node, the third switching node, and the fourth switching node in contact with the low-band signal path of a different one of the diplexers.

According to one embodiment, the front end circuitry also includes a second duplexer, a fourth receiver filter, a fifth receiver filter, and a sixth receiver filter. The second duplexer is configured to pass transmit signals about a second operating band between a sixth transceiver node and a fifth switching node and pass receive signals about a first portion of the second operating band between the fifth switching node and a seventh transceiver node. The fourth receiver filter is configured to pass receive signals about the first portion of the second operating band between a sixth switching node and an eighth transceiver node, while attenuating other signals. The fifth receiver filter is configured to pass receive signals about a second portion of the second operating band between a seventh switching node and a ninth transceiver node, while attenuating other signals. The sixth receiver filter is configured to pass receive signals about the second portion of the second operating band between an eighth switching node and a tenth transceiver node, while attenuating other signals.

According to one embodiment, the front end switching circuitry is configured to place each one of the fifth switching node, the sixth switching node, the seventh switching node, and the eighth switching node in contact with the high-band signal path of a different one of the diplexers.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 1 is a table describing a number of wireless communication operating bands in the wireless spectrum.

FIGS. 2A-2D are diagrams representing a number of carrier aggregation configurations for a mobile device.

FIG. 6 is a schematic illustrating details of the front end switching circuitry shown in FIG. 5 according to one embodiment of the present disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
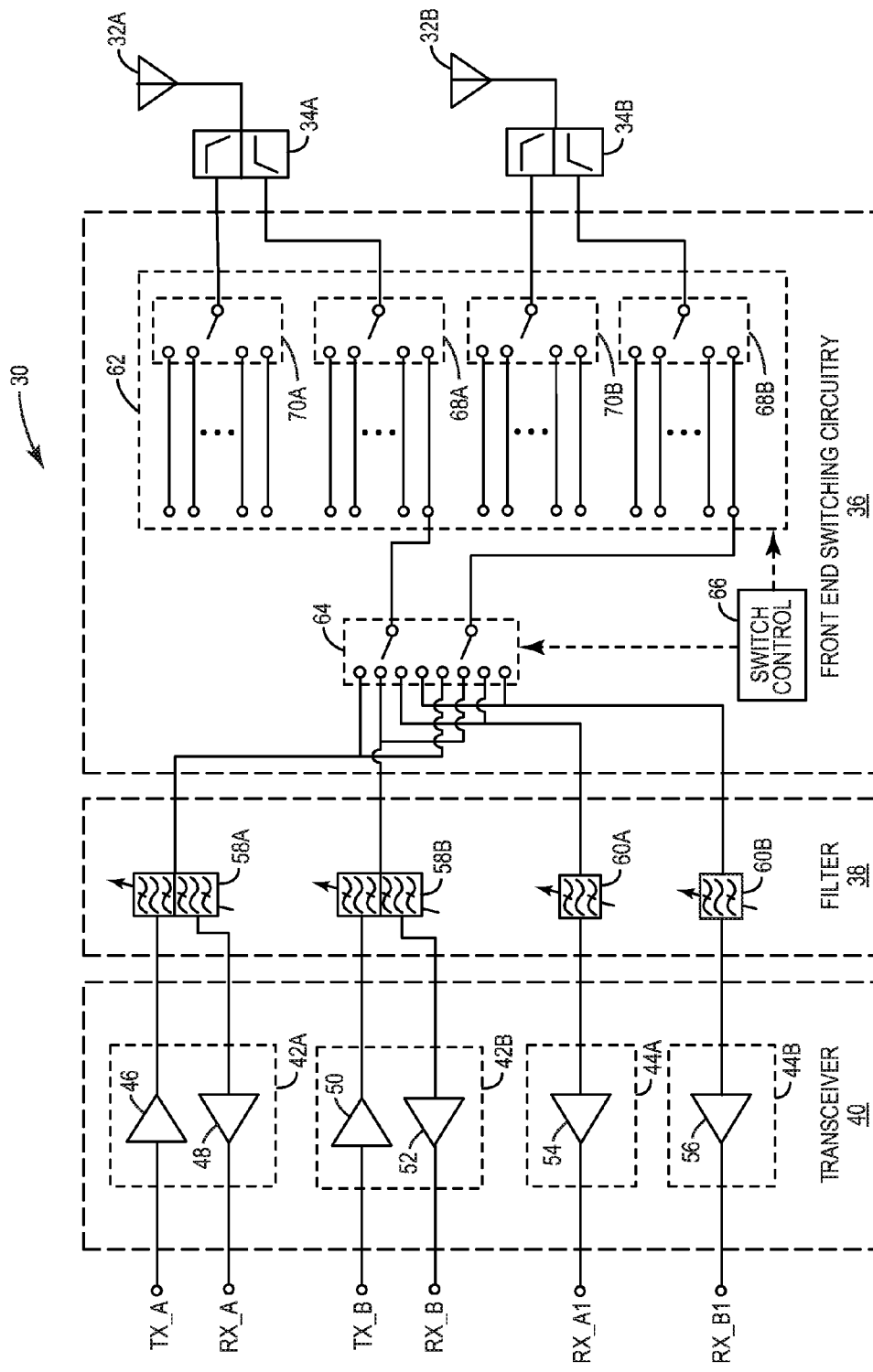
FIG. 3 is a schematic illustrating conventional front end circuitry that is capable of operating in one or more carrier aggregation configurations.
Figure 4:
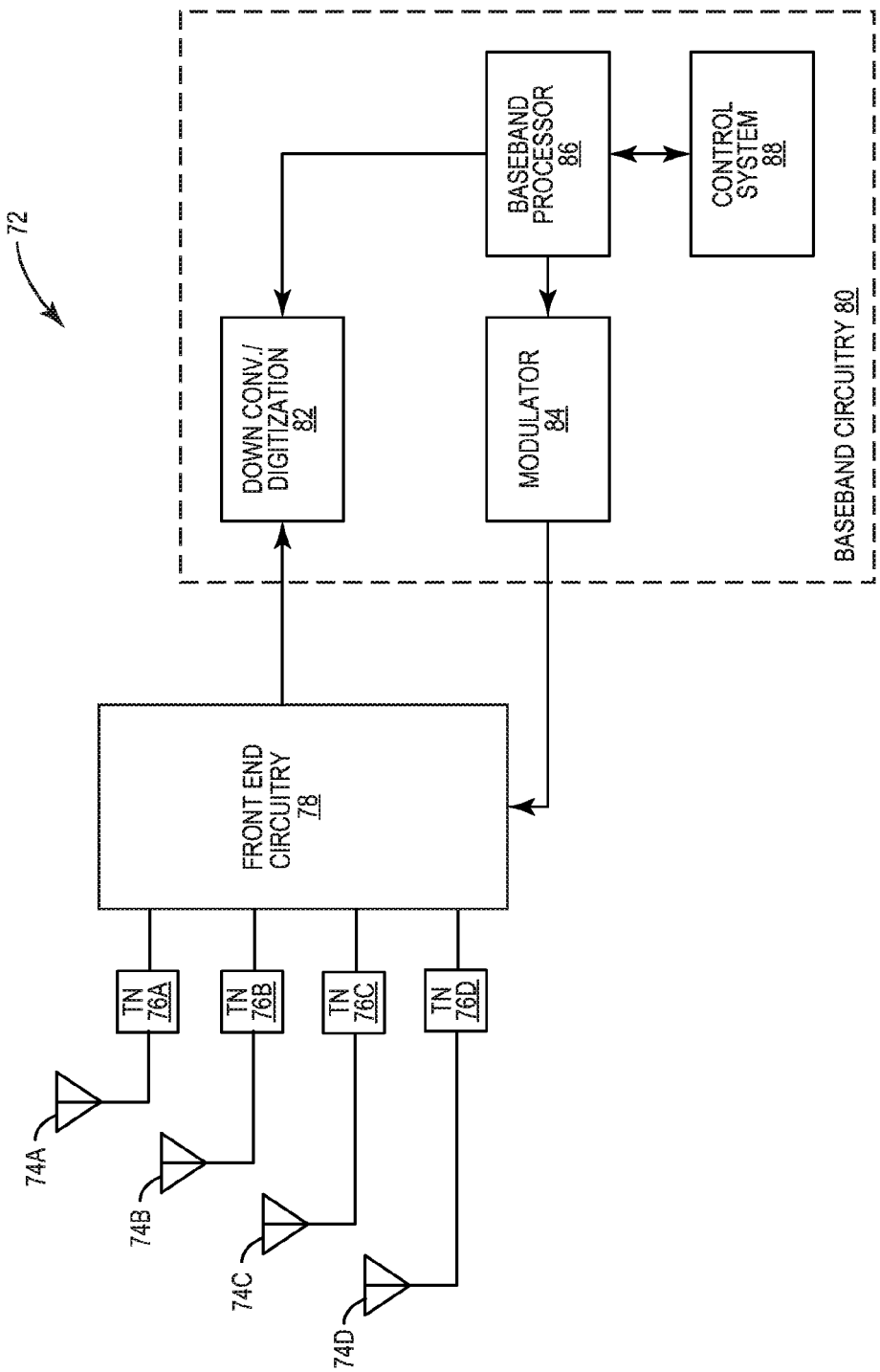
FIG. 4 is a block diagram illustrating a mobile terminal according to one embodiment of the present disclosure.

Turning now to FIG. 4, a mobile terminal 72 suitable for a variety of carrier aggregation configurations is shown according to one embodiment of the present disclosure. The mobile terminal 72 includes four antennas 74, antenna tuning circuitry 76, front end circuitry 78, and baseband circuitry 80. Specifically, the mobile terminal 72 includes a first antenna 74A coupled to the front end circuitry 78 through first antenna tuning circuitry 76A, a second antenna 74B coupled to the front end circuitry 78 through second antenna tuning circuitry 76B, a third antenna 74C coupled to the front end circuitry 78 through third antenna tuning circuitry 76C, and a fourth antenna 74D coupled to the front end circuitry 78 through fourth antenna tuning circuitry 76D. The baseband circuitry 80 includes down-conversion/digitization circuitry 82, a modulator 84, a baseband processor 86, and a control system 88. In operation, one or more radio frequency (RF) signals are received at the antennas 74 and passed through the antenna tuning circuitry 76 to the front end circuitry 78. The front end circuitry 78 then filters and amplifies the received signals, selectively delivering all or a portion thereof to the baseband circuitry 80. In the baseband circuitry 80, down-conversion/digitization circuitry 82 down-converts the filtered and amplified receive signals to generate an intermediate or baseband signal, which is then digitized into one or more digital streams and delivered to the baseband processor 86. The baseband processor 86 processes the digital streams to extract the information or data bits conveyed in the signal. The processing may include demodulation, decoding, or error correction operations. As such, the baseband processor 86 may be implemented in one or more digital signal processors (DSPs).

On the transmit side, the baseband processor 86 receives digitized data, which may represent voice, data, or control information, from the control system 88, which it encodes for transmission. The encoded data is output to the modulator 84, where it is modulated at a desired transmit frequency and sent to the front end circuitry 78. An RF power amplifier in the front end circuitry 78 amplifies the modulated carrier signal to a level appropriate for transmission and delivers the amplified and modulated carrier signal to one or more of the antennas 74 through the antenna tuning circuitry 76.

Figure 5:
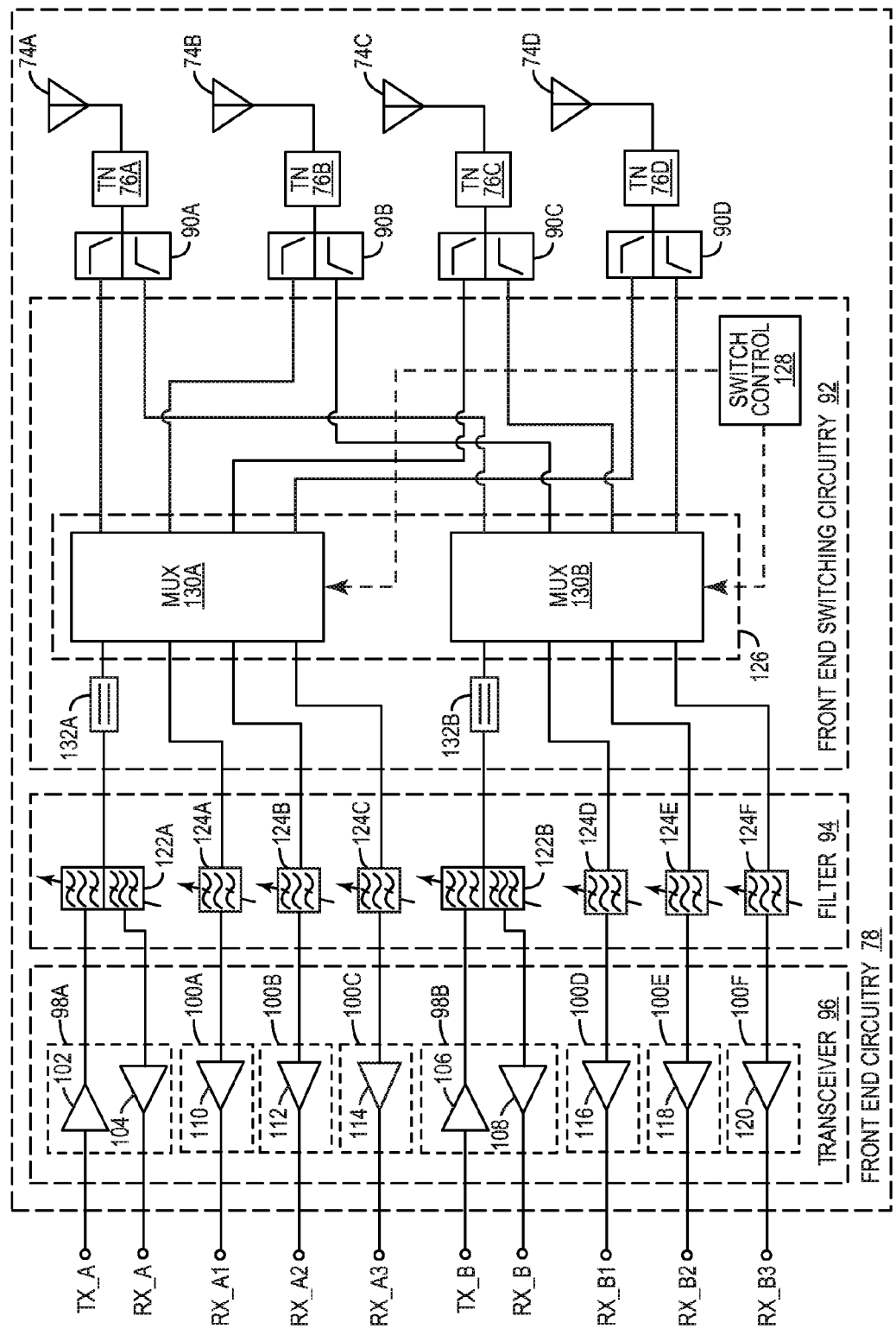
FIG. 5 is a schematic illustrating details of the front end circuitry shown in FIG. 4 according to one embodiment of the present disclosure.

FIG. 5 shows details of the front end circuitry 78 shown in FIG. 4 according to one embodiment of the present disclosure. The first antenna 74A, the second antenna 74B, the third antenna 74C, the fourth antenna 74D, and the antenna tuning circuitry 76 are shown for context. The front end circuitry 78 includes a first diplexer 90A, a second diplexer 90B, a third diplexer 90C, a fourth diplexer 90D, front end switching circuitry 92, filtering circuitry 94, and transceiver circuitry 96. The transceiver circuitry 96 includes a first transceiver module 98A, a second transceiver module 98B, a first receiver module 100A, a second receiver module 100B, a third receiver module 100C, a fourth receiver module 100D, a fifth receiver module 100E, and a sixth receiver module 100F. As will be appreciated by those of ordinary skill in the art, the first transceiver module 98A and the first receiver module 100A may each be associated with all or a portion of a first operating band (hereinafter referred to as band A), such that the first transceiver module 98A is configured to support the transmission and reception of signals about band A or a portion thereof, and the first receiver module 100A is configured to support the reception of signals about band A or a portion thereof. The second receiver module 100B and the third receiver module 100C may also be associated with all or a portion of band A, such that the second receiver module 100B and the third receiver module 100C are configured to support the reception of signals about band A or a portion thereof. In one embodiment, the first transceiver module 98A and the first receiver module 100A are associated with a first portion of band A, while the second receiver module 100B and the third receiver module 100C are associated with a second portion of band A, as discussed in further detail below.

Similar to the first transceiver module 98A and the first receiver module 100A, the second transceiver module 98B and the fourth receiver module 100D may each be associated with all or a portion of a second operating band (hereinafter referred to as band B), such that the second transceiver module 98B is configured to support the transmission and reception of signals about band B or a portion thereof, and the fourth receiver module 100D is configured to support the reception of signals about band B or a portion thereof. The fifth receiver module 100E and the sixth receiver module 100F may also be configured to support the reception of signals about band B or a portion thereof. In one embodiment, the second transceiver module 98B and the fourth receiver module 100D are associated with a first portion of band B, while the fifth receiver module 100E and the sixth receiver module 100F are associated with a second portion of band B, as discussed in further detail below.

Specifically, the first transceiver module 98A may include a first power amplifier 102 and a first low noise amplifier (LNA) 104. The first transceiver module 98A may be configured to receive band A modulated baseband transmit signals at a band A transmit node TX_A, amplify the band A baseband signals to a level appropriate for transmission from any one of the antennas 74 using the first power amplifier 102, and deliver the amplified band A transmit signals to the front end switching circuitry 92 through the filtering circuitry 94. The front end switching circuitry 92 can then deliver the amplified band A transmit signals to the appropriate antenna 74 for transmission. Further, the first transceiver module 98A may be configured to receive band A signals at the first LNA 104 through the filtering circuitry 94, amplify the band A receive signals to an appropriate level using the first LNA 104, and deliver the amplified band A receive signals to a band A receive node RX_A for further processing, for example, by the baseband circuitry 80 (FIG. 4).

Similar to the first transceiver module 98A, the second transceiver module 98B may include a second power amplifier 106 and a second LNA 108. The second transceiver module 98B may be configured to receive band B modulated baseband transmit signals at a band B transmit node TX_B, amplify the band B modulated baseband transmit signals to a level appropriate for transmission from one of the antennas 74, and deliver the amplified band B transmit signals to the front end switching circuitry 92 through the filtering circuitry 94. The front end switching circuitry 92 can then deliver the amplified band B transmit signals to the appropriate antenna 74 for transmission. Further, the second transceiver module 98B may be configured to receive band B receive signals at the second LNA 108 through the filtering circuitry 94, amplify the band B receive signals to an appropriate level using the second LNA 108, and deliver the amplified band B receive signals to a band B receive node RX_B for further processing, for example, by the baseband circuitry 80 (FIG. 4).

The front end circuitry may be configured to operate in one or more carrier aggregation configurations. Accordingly, the receiver modules 100 and the filtering circuitry 94 are provided. The first receiver module 100A may include a first receiver LNA 110. The first receiver module 100A may be configured to receive band A signals from the front end switching circuitry 92 at the first receiver LNA 110 through the filtering circuitry 94, amplify the band A receive signals to an appropriate level using the first receiver LNA 110, and deliver the amplified band A receive signals to a second band A receive node RX_A1 for further processing, for example, by the baseband circuitry 80 (FIG. 4). Similarly, the second receiver module 100B may include a second receiver LNA 112. The second receiver module 100B may also be configured to receive band A receive signals from the front end switching circuitry 92 at the second receiver LNA 112 through the filtering circuitry 94, amplify the band A receive signals to an appropriate level using the second receiver LNA 112, and deliver the amplified band A receive signals to a third band A receive node RX_A2 for further processing, for example, by the baseband circuitry 80 (FIG. 4). The third receiver module 100C may also include a third receiver LNA 114. The third receiver module 100C may be configured to receive band A receive signals from the front end switching circuitry 92 at the third receiver LNA 114 through the filtering circuitry 94, amplify the band A receive signals to an appropriate level using the third receiver LNA 114, and deliver the amplified band A receive signals to a fourth band A receive node RX_A3 for further processing, for example, by the baseband circuitry 80 (FIG. 4).

The fourth receiver module 100D may include a fourth receiver LNA 116. The fourth receiver module 100D may be configured to receive band B signals from the front end switching circuitry 92 at the fourth receiver LNA 116, amplify the band B receive signals to an appropriate level using the fourth receiver LNA 116, and deliver the amplified band B receive signals to a second band B receive node RX_B1 for further processing, for example, by the baseband circuitry 80 (FIG. 4). Similarly, the fifth receiver module 100E may include a fifth receiver LNA 118. The fifth receiver module 100E may also be configured to receive band B receive signals from the front end switching circuitry 92 at the fifth receiver LNA 118 through the filtering circuitry 94, amplify the band B receive signals to an appropriate level using the fifth receiver LNA 118, and deliver the amplified band B signals to a third band B receive node RX_B2 for further processing, for example, by the baseband circuitry 80 (FIG. 4). The sixth receiver module 100F may include a sixth receiver LNA 120. The sixth receiver module 100F may also be configured to receive band B receive signals from the front end switching circuitry 92 at the sixth receiver LNA 120 through the filtering circuitry 94, amplify the band B receive signals to an appropriate level using the sixth receiver LNA 120, and deliver the amplified band B receive signals to a fourth band B receive node RX_B3 for further processing, for example, by the baseband circuitry 80 (FIG. 4).

The filtering circuitry 94 may include a first duplexer 122A, a second duplexer 122B, a first receiver filter 124A, a second receiver filter 124B, a third receiver filter 124C, a fourth receiver filter 124D, a fifth receiver filter 124E, and a sixth receiver filter 124F. The first duplexer 114A may separate band A transmit signals from band A receive signals, routing band A transmit signals from the first power amplifier 102 to the front end switching circuitry 92 and routing band A receive signals from the front end switching circuitry 92 to the first LNA 104, while providing isolation between the first power amplifier 102 and the first LNA 104 and attenuating signals outside of band A. The first receiver filter 124A may isolate and route band A receive signals from the front end switching circuitry 92 to the first receiver LNA 110, attenuating signals outside of band A. The second receiver filter 124B may isolate and route band A receive signals from the front end switching circuitry 92 to the second receiver LNA 112, attenuating signals outside of band A. The third receiver filter 124C may isolate and route band A receive signals from the front end switching circuitry 92 to the third receiver LNA 114, attenuating signals outside of band A.

The first duplexer 122A, the first receiver filter 124A, the second receiver filter 124B, and the third receiver filter 124C may all be tunable. As discussed above, when a single transceiver module and a single receiver module are used to support the entirety of an operating band, such as band A, in an intra-band non-contiguous carrier aggregation configuration, the pass-band of each one of the filtering elements must be large enough to cover the entire operating band (i.e., the required pass-band of each filtering element could be as large as 80 MHz in some cases). Accordingly, the use of tunable filtering elements in conventional filtering circuitry is often not an option due to cost, complexity, or efficiency concerns. In order to solve this problem, the first duplexer 122A and the first receiver filter 124A may only pass a first portion of band A signals between the front end switching circuitry 92, the first LNA 104, and the first receiver LNA 110, respectively. Further, the second receiver filter 124B and the third receiver filter 124C may only pass a second portion of band A signals between the front end switching circuitry 92, the second receiver LNA 112, and the third receiver LNA 114, respectively. The transmit path of the first duplexer 122A may continue to pass transmit signals about the entirety of band A between the first power amplifier 102 and the front end switching circuitry 92. By providing different receiver filters 124 and associated transceiver modules 98 or receiver modules 100 for different portions of band A, the pass-band of each one of the duplexers 122 and the receiver filters 124 may be significantly reduced (i.e., the required pass band of each filtering element is only required to be one or two channels wide, from 20-40 MHz). Accordingly, the complexity of each one of the first duplexer 122A, the first receiver filter 124A, the second receiver filter 124B, and the third receiver filter 124C may be significantly reduced.

As will be appreciated by those of ordinary skill in the art, at least four antennas 74 are required in the embodiment described above in order to provide the separate signal paths to the first duplexer 122A, the first receiver filter 124A, the second receiver filter 124B, and the third receiver filter 124C. In one embodiment, the first duplexer 122A is coupled to a first one of the antennas 74, the first receiver filter 124A is coupled to a second one of the antennas 74, the second receiver filter 124B is coupled to a third one of the antennas 74, and the third receiver filter 124C is coupled to a fourth one of the antennas 74 via the front end switching circuitry 92. Accordingly, the front end circuitry 78 may simultaneously transmit a signal about band A via the first one of the antennas 74, receive a signal about a first portion of band A via the first one of the antennas 74, receive a signal about the first portion of band A via the second one of the antennas 74, receive a signal about a second portion of band A via the third one of the antennas 74, and receive a signal about the second portion of band A via the fourth one of the antennas 74. The front end circuitry 78 may thus aggregate bandwidth across band A, even when the portions of aggregated bandwidth are non-contiguous, without requiring filtering elements capable of providing a large pass-band.

In one embodiment, the receive path of the first duplexer 122A and the first receiver filter 124A are configured to pass signals about the upper half of band A, while the second receiver filter 124B and the third receiver filter 124C are configured to pass signals about the lower half of band A, while attenuating other signals. Accordingly, the bandwidth of each one of the first duplexer 122A, the first receiver filter 124A, the second receiver filter 124B, and the third receiver filter 124C may be cut in half, thereby improving the performance of the front end circuitry 78.

The second duplexer 114B may separate band B transmit signals from band B receive signals, routing band B transmit signals from the second power amplifier 106 to the front end switching circuitry 92 and routing band B receive signals from the front end switching circuitry 92 to the second LNA 108, while providing isolation between the second power amplifier 106 and the second LNA 108 and attenuating signals outside of band B. The fourth receiver filter 124D may isolate and route band B receive signals from the front end switching circuitry 92 to the fourth receiver LNA 116, attenuating signals outside of band B. The fifth receiver filter 124E may isolate and route band B receive signals from the front end switching circuitry 92 to the fifth receiver LNA 118, attenuating signals outside of band B. The sixth receiver filter 124F may isolate and route band B receive signals from the front end switching circuitry 92 to the sixth receiver LNA 120, attenuating signals outside of band B.

The second duplexer 122B, the fourth receiver filter 124D, the fifth receiver filter 124E, and the sixth receiver filter 124F may all be tunable. As discussed above, when a single transceiver module and a single receiver module are used to support the entirety of an operating band, such as band B, in an intra-band non-contiguous carrier aggregation configuration, the pass-band of each one of the filtering elements must be large enough to cover the entire operating band (i.e., the required pass-band of each filtering element could be as large as 80 MHz in some cases). Accordingly, the use of tunable filtering elements in the filtering circuitry 94 is often not an option due to cost, complexity, or efficiency concerns. In order to solve this problem, the second duplexer 122B and the fourth receiver filter 124D may only pass a first portion of band B signals between the front end switching circuitry 92, the second LNA 108, and the fourth receiver LNA 116, respectively. Further, the fifth receiver filter 124E and the sixth receiver filter 124F may only pass a second portion of band B signals between the front end switching circuitry 92, the fifth receiver LNA 118, and the sixth receiver LNA 120, respectively. The transmit path of the second duplexer 122B may continue to pass transmit signals about the entirety of band B between the second power amplifier 106 and the front end switching circuitry 92. By providing different receiver filters 124 and associated transceiver modules 98 or receiver modules 100 for different portions of band B, the pass-band of each one of the duplexers 122 and the receiver filters 124 may be significantly reduced (i.e., the required pass band of each filtering element is only required to be one or two channels wide, from 20-40 MHz). Accordingly, the complexity of each one of the second duplexer 122B, the fourth receiver filter 124D, the fifth receiver filter 124E, and the sixth receiver filter 124F may be significantly reduced.

As will be appreciated by those of ordinary skill in the art, at least four antennas 74 are required in the embodiment described above in order to provide the separate signals paths to the second duplexer 122B, the fourth receiver filter 124D, the fifth receiver filter 124E, and the sixth receiver filter 124F. In one embodiment, the second duplexer 122B is coupled to a first one of the antennas 74, the fourth receiver filter 124D is coupled to a second one of the antennas 74, the fifth receiver filter 124E is coupled to a third one of the antennas 74, and the sixth receiver filter 124F is coupled to a fourth one of the antennas 74 via the front end switching circuitry 92. Accordingly, the front end circuitry 78 may simultaneously transmit a signal about band B via the first one of the antennas 74, receive a signal about a first portion of band B via the first one of the antennas 74, receive a signal about the first portion of band B via the second one of the antennas 74, receive a signal about a second portion of band B via the third one of the antennas 74, and receive a signal about the second portion of band B via the fourth one of the antennas 74. The front end circuitry 78 may thus aggregate bandwidth across band B, even when the portions of aggregated bandwidth are non-contiguous, without requiring filtering elements capable of providing a large pass-band.

In one embodiment, the receive path of the second duplexer 122B and the fourth receiver filter 124D are configured to pass signals about the upper half of band B, while the fifth receiver filter 124E and the sixth receiver filter 124F are configured to pass signals about the lower half of band B, while attenuating other signals. Accordingly, the bandwidth of each one of the second duplexer 122B, the fourth receiver filter 124D, the fifth receiver filter 124E, and the sixth receiver filter 124F may be cut in half, thereby improving the performance of the front end circuitry 78.

In one embodiment, multiple duplexers 122 or multiple receiver filters 124 are coupled to a single one of the antennas 74. For example, one of the first duplexer 122A, the first receiver filter 124A, the second receiver filter 124B, or the third receiver filter 124C may be coupled to the same antenna 74 as the second duplexer 122B, the fourth receiver filter 124D, the fifth receiver filter 124E, or the sixth receiver filter 124F. Accordingly, in addition to aggregating bandwidth within a single operating band, the front end circuitry 78 may also aggregate bandwidth across multiple operating bands, such as band A and band B.

The front end switching circuitry 92 may include antenna switching circuitry 126 and switching control circuitry 128. The antenna switching circuitry 126 may comprise two or more multiplexers (MUXs) 130 coupled between the filtering circuitry 94 and the diplexers 90. Specifically, the antenna switching circuitry 126 may include a first low-band MUX 130A coupled to the antennas 74 via a low-band node of the diplexers 90, and a second mid/high-band MUX 130B coupled to the antennas 74 via a mid/high-band node of the diplexers 90. Each one of the diplexers 90 may be configured to pass low-band signals between the low-band MUX 130A and the connected antenna 74, pass mid/high-band signals between the mid/high-band MUX 130B and the connected antenna 74, while providing isolation between the low-band MUX 130A and the mid/high-band MUX 130B and attenuating other signals. The antenna switching circuitry 126 may be configured to place any one of the filtering elements in the filtering circuitry 94, and thus their associated module in the transceiver circuitry 96 in contact with one of the antennas 74 in order to transmit or receive signals about a given operating band or a portion thereof. Further, the antenna switching circuitry 126 may be configured to switch the antenna 74 presented to any one of the filtering elements in the filtering circuitry 94, and thus their associated module in the transceiver circuitry 96, in order to transmit and receive signals about the antenna 74 with the most desirable transmit or receive characteristics at any given time. The switching control circuitry 128 may control the antenna switching circuitry 126 in order to place the appropriate one of the filtering elements in the filtering circuitry 94, and thus their associated module in the transceiver circuitry 96 in contact with a desired one of the antennas 74, according to the operating mode of the front end circuitry 78. For example, the switching control circuitry 128 may operate the antenna switching circuitry 126 in order to place any of the filtering elements in the filtering circuitry 94 in contact with one of the antennas 74 in any of the configurations described above in order to enable the front end circuitry 78 to operate in one or more carrier aggregation configurations.

In one embodiment, directional couplers 132 are also included between each one of the duplexers 122 and each one of the MUXs 130 in order to allow control of the directionality of signals in the signal path.

The baseband circuitry 80 (FIG. 4) may use the band A receive signal at the band A receive node RX_A as a first main band A receive signal, and use the band A receive signal at the second band A receive node RX_A1 as a first alternate band A receive signal, such as from multiple-input-multiple-output (MIMO) and/or diversity applications. Similarly, the baseband circuitry 80 (FIG. 4) may use the band A receive signal at the third band A receive node RX_A2 as a second main band A receive signal, and use the band A receive signal at the fourth band A receive node RX_A3 as a second alternate band A receive signal. Alternatively, the baseband circuitry 80 (FIG. 4) may switch which band A receive signal is used for the main and secondary receive signal, depending on the signal characteristics of each one of the receive signals. Accordingly, the antenna 74 with the most favorable reception characteristics for the band A signal may be used as the main receive signal for band A.

The baseband circuitry 80 (FIG. 4) may also use the band B receive signal at the band B receive node RX_B as a first main band B receive signal, and use the band B receive signal at the second band A receive node RX_A1 as a first alternate band B receive signal. Similarly, the baseband circuitry 80 (FIG. 4) may use the band B receive signal at the third band B receive node RX_B2 as a second main band B receive signal, and use the band B receive signal at the fourth band B receive node RX_B3 as a second alternate band B receive signal. Alternatively, the baseband circuitry 80 (FIG. 4) may switch which band B receive signal is used for the main and secondary receive signal, thereby allowing the antenna 74 with the most favorable band B signal to be used to generate the main band B receive signal.

In one embodiment, the antenna tuning circuitry 76 coupled between each one of the diplexers 90 and each one of the antennas 74 is configured to optimize each one of the antennas 74 for transmitting and/or receiving signals about a certain operating band. In an additional embodiment, any two of the antennas 74 may be combined into a single dual-feed antenna, the details of which will be appreciated by those of ordinary skill in the art.

As discussed above, the foregoing functionality allows the front end circuitry 78 to operate in a variety of carrier aggregation configurations. For example, the front end circuitry 78 may operate in a low-band/low-band carrier aggregation configuration, in which the portions of bandwidth aggregated by the front end circuitry 78 are located in the same or different low-band operating bands within the low-band frequency range of about 600 MHz to 1 GHz. The front end circuitry may also operate in a mid-band/mid-band carrier aggregation configuration, in which the portions of bandwidth aggregated by the front end circuitry 78 are in the same or different mid-band operating bands within the mid-band frequency range of about 1.7 GHz to 2.2 GHz. Alternatively, the front end circuitry 78 may operate in a high-band/high-band carrier aggregation configuration, in which the portions of bandwidth aggregated by the front end circuitry 78 are in the same or different high-band operating bands within the high-band frequency range of about 2.3 GHz to 2.5 GHz. Additionally, the front end circuitry 78 may operate in any combination of the above.

As a specific example, the front end circuitry 78 may operate in a band 17/band 4 carrier aggregation configuration, in which band A is band 17, with a transmit frequency range of about 704 MHz to 716 MHz and a receive frequency range of about 734 MHz to 746 MHz and band B is band 4, with a transmit frequency range of about 1710 MHz to 1755 MHz, and a receive frequency range of about 2110 MHz to 2155 MHz. In this configuration, the front end circuitry 78 may simultaneously aggregate bandwidth across band A and aggregate bandwidth across band B.

In a non-carrier aggregation configuration of the front end circuitry 78, the switching control circuitry 128 may operate the antenna switching circuitry 126 to place one of the duplexers 122 and an associated one of the receiver filters 124 in contact with different antennas 74, while leaving the other antennas 74 unused. Accordingly, one of the antennas 74 may be used to transmit and receive signals, while a different one of the antennas 74 may be used to receive a secondary receive signal, such as for MIMO and/or diversity applications.

FIG. 6 shows details of each one of the MUXs 130 shown in FIG. 5 according to one embodiment of the present disclosure. As shown in FIG. 6, each one of the MUXs 130 includes sixteen switches SW arranged in a grid pattern such that any one of the inputs 134 to the MUX 130 can be connected to any one of the outputs 136 to the MUX 130. The switching control circuitry 128 may be coupled to each one of the switches SW in order to control the signal path from any one of the inputs 134 to any one of the outputs 136.

Due to the flexibility of the MUXs 130, the front end circuitry 78 (FIG. 5) is capable of coupling any one of the antennas 74 to any one of the filtering elements in the filtering circuitry 94, and thus their corresponding modules in the transceiver circuitry 96. Further, the switching control circuitry 128 may dynamically switch the antenna 74 coupled to a given filtering element and thus corresponding module in the transceiver circuitry 96 in order to optimize the transmission and/or reception of signals in the front end circuitry 78 as the characteristics of the antennas 74 change over time.

Those skilled in the art will recognize improvements and modifications to the embodiments of the present disclosure. All such improvements and modifications are considered within the scope of the concepts disclosed herein and the claims that follow.

What is claimed is:

1. Front end circuitry comprising:
a first duplexer configured to pass transmit signals about a first operating band between a first transceiver node and a first switching node and pass receive signals about a first portion of the first operating band between the first switching node and a second transceiver node, while attenuating other signals;
a first receiver filter configured to pass receive signals about the first portion of the first operating band between a second switching node and a third transceiver node, while attenuating other signals;
a second receiver filter configured to pass receive signals about a second portion of the first operating band between a third switching node and a fourth transceiver node, while attenuating other signals;
a third receiver filter configured to pass receive signals about the second portion of the first operating band between a fourth switching node and a fifth transceiver node, while attenuating other signals; and
front end switching circuitry coupled between each one of the switching nodes and at least four antenna nodes, the front end switching circuitry configured to place each one of the switching nodes in contact with a different one of the antenna nodes.

2. The front end circuitry of claim 1 wherein the first portion of the first operating band and the second portion of the first operating band are non-contiguous.

3. The front end circuitry of claim 1 further comprising switching control circuitry coupled to the front end switching circuitry and configured to cause the front end switching circuitry to place each one of the switching nodes in contact with a different one of the antenna nodes.

4. The front end circuitry of claim 1 further comprising a diplexer between each one of the at least four antenna nodes and the front end switching circuitry, each one of the diplexers including a low-band signal path and a high-band signal path.

5. The front end circuitry of claim 4 wherein the front end switching circuitry is configured to place each one of the first switching node, the second switching node, the third switching node, and the fourth switching node in contact with the low band signal path of a different one of the diplexers.

6. The front end circuitry of claim 5 further comprising:
a second duplexer configured to pass transmit signals about a second operating band between a sixth transceiver node and a fifth switching node and pass receive signals about a first portion of the second operating band between the fifth switching node and a seventh transceiver node, while attenuating other signals;
a fourth receiver filter configured to pass receive signals about the first portion of the second operating band between a sixth switching node and an eighth transceiver node, while attenuating other signals;
a fifth receiver filter configured to pass receive signals about a second portion of the second operating band between a seventh switching node and a ninth transceiver node, while attenuating other signals; and
a sixth receiver filter configured to pass receive signals about the second portion of the second operating band between an eighth switching node and a tenth transceiver node, while attenuating other signals.

7. The front end circuitry of claim 6 wherein the front end switching circuitry is configured to place each one of the fifth switching node, the sixth switching node, the seventh switching node, and the eighth switching node in contact with the high band signal path of a different one of the diplexers.

8. The front end circuitry of claim 6 wherein the first portion of the second operating band and the second portion of the second operating band are non-contiguous.

9. The front end circuitry of claim 6 wherein the first operating band is a low-band operating band with a frequency range in the low-band frequency range of about 600 MHz to 1 GHz and the second operating band is one of a mid-band operating band with a frequency range in the mid-band frequency range of about 1.7 GHz to 2.2 GHz and a high-band operating band with a frequency range in the high-band frequency range of about 2.3 GHz to 2.5 GHz.

10. The front end circuitry of claim 1 further comprising antennas coupled to each one of the antenna nodes.

11. The front end circuitry of claim 1 further comprising:
a first power amplifier coupled to the first transceiver node;
a first low noise amplifier (LNA) coupled to the second transceiver node;
a first receiver LNA coupled to the third transceiver node;
a second receiver LNA coupled to the fourth transceiver node; and
a third receiver LNA coupled to the fifth transceiver node.

12. The front end circuitry of claim 11 wherein:
the first power amplifier is configured to receive and amplify a baseband transmit signal about the first operating band;
the first LNA is configured to receive and amplify a receive signal about the first portion of the first operating band;
the first receiver LNA is configured to receive and amplify a receive signal about the first portion of the second operating band;
the second receiver LNA is configured to receive and amplify a receive signal about the second portion of the second operating band; and
the third receiver LNA is configured to receive and amplify a receive signal about the second portion of the second operating band.

13. A mobile terminal comprising:
baseband circuitry;
at least four antennas;
front end circuitry coupled between the baseband circuitry and the at least four antennas, the front end circuitry comprising:
a first duplexer configured to pass transmit signals about a first operating band between a first transceiver node and a first switching node and pass receive signals about a first portion of the first operating band between the first switching node and a second transceiver node, while attenuating other signals;
a first receiver filter configured to pass receive signals about the first portion of the first operating band between a second switching node and a third transceiver node, while attenuating other signals;

a second receiver filter configured to pass receive signals about a second portion of the first operating band between a third switching node and a fourth transceiver node, while attenuating other signals;

a third receiver filter configured to pass receive signals about the second portion of the first operating band between a fourth switching node and a fifth transceiver node, while attenuating other signals; and front end switching circuitry coupled between each one of the switching nodes and the at least four antennas, the front end switching circuitry configured to place each one of the switching nodes in contact with a different one of the antenna nodes.

14. The mobile terminal of claim 13 wherein the first portion of the first operating band and the second portion of the first operating band are non-contiguous.

15. The mobile terminal of claim 13 further comprising switching control circuitry coupled to the front end switching circuitry and configured to cause the front end switching circuitry to place each one of the switching nodes in contact with a different one of the antenna nodes.

16. The mobile terminal of claim 13 further comprising a diplexer between each one of the antennas and the front end switching circuitry, each one of the diplexers including a low-band signal path and a high-band signal path.

17. The mobile terminal of claim 16 wherein the front end switching circuitry is configured to place each one of the first switching node, the second switching node, the third switching node, and the fourth switching node in contact with the low band signal path of a different one of the diplexers.

18. The mobile terminal of claim 17 further comprising:
a second duplexer configured to pass transmit signals about a second operating band between a sixth transceiver node and a fifth switching node and pass receive signals about a first portion of the second operating band between the fifth switching node and a seventh transceiver node, while attenuating other signals;

a fourth receiver filter configured to pass receive signals about the first portion of the second operating band between a sixth switching node and an eighth transceiver node;

a fifth receiver filter configured to pass receive signals about a second portion of the second operating band between a seventh switching node and a ninth transceiver node; and a sixth receiver filter configured to pass receive signals about the second portion of the second operating band between an eighth switching node and a tenth transceiver node.

19. The mobile terminal of claim 18 wherein the front end switching circuitry is configured to place each one of the fifth switching node, the sixth switching node, the seventh switching node, and the eighth switching node in contact with the high band signal path of a different diplexer.

20. The mobile terminal of claim 18 wherein the first portion of the second operating band and the second portion of the second operating band are non-contiguous.

21. The mobile terminal of claim 18 wherein the first operating band is a low-band operating band with a frequency range in the low-band frequency range of about 600 MHz to 1 GHz and the second operating band is one of a mid-band operating band with a frequency range in the mid-band frequency range of about 1.7 GHz to 2.2 GHz and a high-band operating band with a frequency range in the high-band frequency range of about 2.3 GHz to 2.5 GHz.

22. The mobile terminal of claim 13 further comprising:
a first power amplifier coupled to the first transceiver node;
a first low noise amplifier (LNA) coupled to the second transceiver node;
a first receiver LNA coupled to the third transceiver node;
a second receiver LNA coupled to the fourth transceiver node; and
a third receiver LNA coupled to the fifth transceiver node.

23. The mobile terminal of claim 22 wherein:
the first power amplifier is configured to receive and amplify a baseband transmit signal about the first operating band;
the first receiver LNA is configured to receive and amplify a receive signal about the first portion of the first operating band;
the first receiver LNA is configured to receive and amplify a receive signal about the first portion of the second operating band;
the second receiver LNA is configured to receive and amplify a receive signal about the second portion of the second operating band; and
the third receiver LNA is configured to receive and amplify a receive signal about the second portion of the second operating band.

* * * * *